United States Patent [19]

Girard et al.

[11] Patent Number: 4,773,262

[45] Date of Patent: Sep. 27, 1988

[54] ELECTRICAL SPIN RIG FOR PROJECTILE WIND TUNNEL TESTING

[75] Inventors: Bertrand Girard; Nguyen D. Ngoc, both of Sillery, Canada

[73] Assignee: Her Majesty the Queen in right of Canada, as represented by the Minister of National Defence, Ottawa, Canada

[21] Appl. No.: 86,528

[22] Filed: Aug. 18, 1987

[30] Foreign Application Priority Data

Dec. 8, 1986 [CA] Canada ............................ 524792

[51] Int. Cl.$^4$ ............................................. G01M 9/00
[52] U.S. Cl. ......................................... 73/147; 73/167
[58] Field of Search ................................. 73/147, 167

[56] References Cited

U.S. PATENT DOCUMENTS

| | | | |
|---|---|---|---|
| 2,343,383 | 3/1944 | Martin et al. | 73/147 |
| 3,447,369 | 6/1969 | Horanoff | 73/147 |
| 4,142,410 | 3/1979 | Pedgonay | 73/147 |

Primary Examiner—Donald O. Woodiel
Attorney, Agent, or Firm—William R. Hinds

[57] ABSTRACT

A spin rig for spinning wind tunnel models has a support mountable on a sting, bearings for mounting the model on the support and an electric motor mounted on the support, inside the model. The motor has a stator fixed to the support and a rotor that is connected to the model. With a D.C. motor of high coercive force permanent magnet stator, the spin rig can be accommodated within a model small enough to be used in small wind tunnels. Tests can be run at constant, controlled spin. Model development costs are significantly reduced.

7 Claims, 1 Drawing Sheet

ELECTRICAL SPIN RIG FOR PROJECTILE WIND TUNNEL TESTING

FIELD OF THE INVENTION

The present invention relates to wind tunnel models and more particularly to wind tunnel models of spinning projectiles.

BACKGROUND

For wind tunnel testing of the various aerodynamic coefficients of spinning projectiles, it is necessary to use instrumented motorized spinning models of the projectiles. Present practice is to use an air turbine for spinning the models. There are however certain difficulties with this arrangement.

Because of the intrinsic physics of air turbines, the model must be fairly large in size, e.g. greater than 3.5 inches (about 9 cm.) in diameter. Because the model cross sectional area has to be very small with respect to the test section area in order to avoid blockage problems, small wind tunnels cannot be used for spinning projectile tests.

With an air turbine spinning motor, the pressure of the air line that feeds the turbine acts as an external force on the model system. This will generate error in the balance measurements. To avoid this, the air turbine is used to accelerate the model to the desired spin rate and then shut down before measurements are made. Consequently, a constant spin rate cannot be maintained. Rolling moment readings cannot be made simultaneously with sting support sweep at various angles of attack. In addition, the turbine air exhaust modifies the flow around the base of the model producing further errors in the measured data.

SUMMARY

The present invention is concerned with the provision of an alternative form of spin rig for a wind tunnel model.

According to the present invention there is provided a spin rig adapted to fit inside a wind tunnel model for spinning the model, the rig comprising:
  a support with a longitudinal axis;
  bearing means mounted on the support and adapted to mount the model on the support for rotation about the longitudinal axis of the support; and
  an electric motor with a stator fixed to the support, a rotor rotatable about the longitudinal axis of the support and means for connecting the rotor to the model for rotating the model and rotor in unison.

A D.C. motor with a high coercive force permanent magnet stator of ferrite or cobalt may be small enough to be housed within a projectile model of about 1.6 inches (about 4 cm.) in diameter while still developing in the order of 220 watts for the time of a wind tunnel run.

The use of an electric spin motor allows measurements to be made while the motor is on. This means that the spin rate can be maintained constant while the model is swept at various angles of attack. Simultaneously, rolling moments can be measured together with the other forces and moments exerted on the model.

A further benefit of the use of an electric motor is the cost of model development, about one tenth of the cost of an air turbine driven model.

BRIEF DESCRIPTION OF THE DRAWINGS

In the accompanying drawings which illustrate an exemplary embodiment of the present invention.

DETAILED DESCRIPTION

Figures 1, 2:
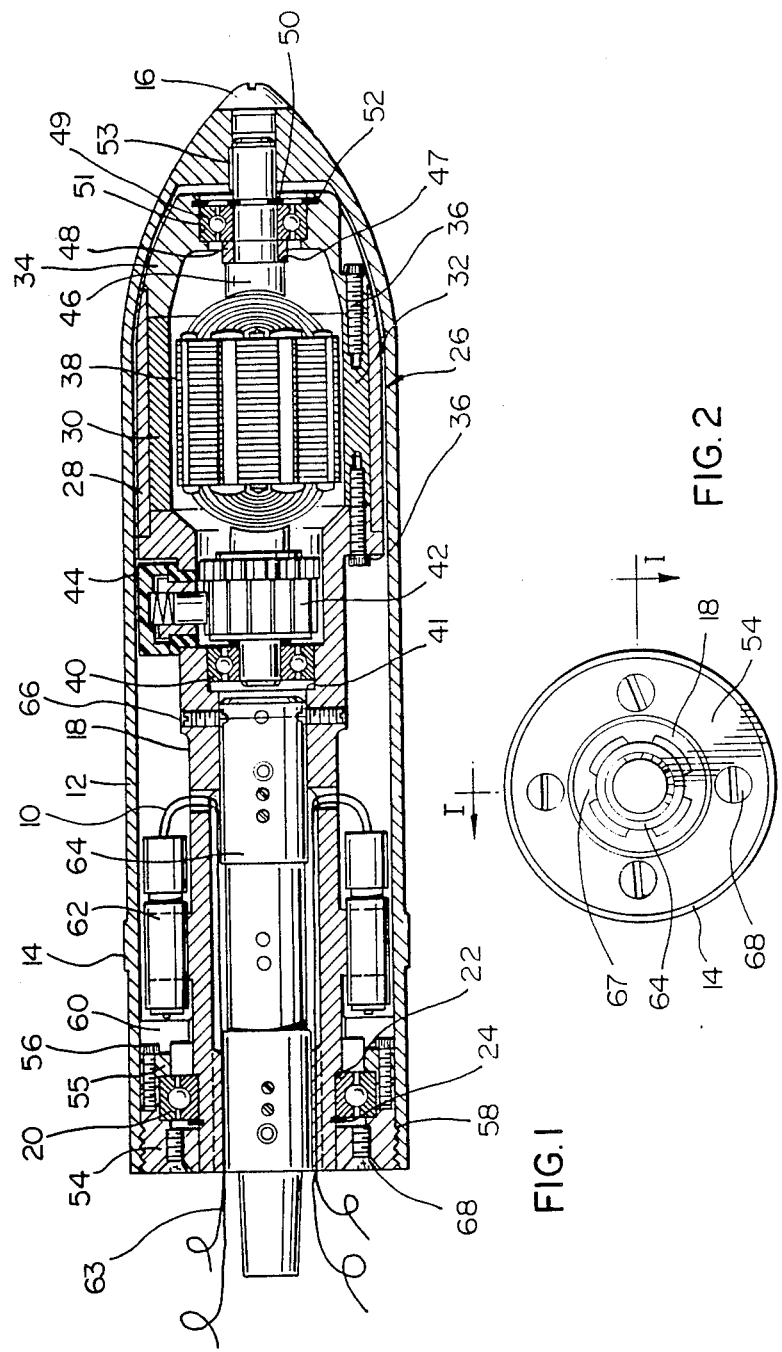
FIG. 1 is an elevation, partially in section, of a projectile model mounted on a spin rig according to the present invention.
FIG. 2 is an aft end elevation of the model and spin rig of FIG. 1.

Referring to the drawings, there is illustrated a spin rig 10 housed within a projectile model 12. The complete unit is intended to be mounted in the conventional way on a sting support in a wind tunnel.

The model has an outer shell 14 closed at the forward end by a nose cap 16. The shell and nose cap are configured in the known way to simulate a projectile shape to be tested.

The spin rig includes an elongate tubular support 18 carrying a large diameter ball bearing 20 at the aft end. The bearing is seated against rearwardly facing shoulder 22 on the outside of the support and is held in place by a retaining ring 24. At the forward end of the spin rig is a DC motor 26. The motor stator is contained within a cylindrical housing 28 extending axially between the support 18 and a forward housing end 34. The stator consists of two ferrite permanent magnets 30 and two cross pieces 32 located circumferentially between the magnets. Cap screws 36 join the support 18 and the forward end of the motor housing 34 to the cross pieces 32.

The rotor 38 of the motor is supported at its aft end in a roller bearing 40 seated in a counterbore 41 of the support 18. The motor has a commutator 42 within the tubular support and conventional motor brushes 44 fitted to the support. At the forward end of the rotor, the motor drive shaft 46 carries a spacer 48 between a shoulder 47 on the shaft and a ball bearing 49. The inner race of the bearing is held in place by a retaining ring 50 while the outer race is seated in a counterbore 51 in the forward end of the motor housing 34 and retained in place by a retaining ring 52. A key 53 joins the shaft 46 to the model shell 14.

At the aft end of the model shell is an annular model base 54 that is secured to the outer race of bearing 20 by an annular retainer 55 and a series of cap screws 56. The model base 54 is externally threaded at 58 to thread into the aft end of the model shell 14. Thus, the shell is supported at the aft end on bearing 20 and at the front end on motor shaft 46.

The rotating retainer 55 carries eight index poles 60 in the space between the shell 14 and the support 18. The stationary support carries four proximity detectors 62 adjacent the index pole 60 to detect the passage of the poles and to generate a signal with a frequency that represents the speed of rotation of the model shell. The leads 63 from the proximity detectors pass through the core of the tubular support 18 to exit at the base of the support.

Seated within the support 18 is a six degrees of freedom strain gauge type balance 64. This is held in place at the forward end by four set screws 66, while at the aft end four lands 67 on the inside of the support 18 engage the cylindrical surface of the balance to hold it in place.

The model base is equipped with four threaded bores that are, in use, filled with dummy screws 68. These bores are useful in assembling the model and spin rig.

While one embodiment of the invention has been described in the foregoing, it is to be understood thta this is by way of example only and is not intended to be limiting. The scope of the invention is to be ascertained solely by reference to the accompanying claims.

We claim:

1. A spin rig adapted to fit inside a wind tunnel model for spinning the model, the rig comprising:

a support with a longitudinal axis;

bearing means mounted on the support and adapted to mount the model on the support for rotation about the longitudinal axis of the support; and an electric motor with a stator fixed to the support, a rotor rotatable about the longitudinal axis of the support and means for connecting the rotor to the model for rotating the model and rotor in unison.

2. A rig according to claim 1, wherein the support comprises a tubular body.

3. A rig according to claim 2, further comprising a balance seated within the tubular body and having an aft end adapted for connection to a sting.

4. A rig according to claim 2, wherein a forward end of the support comprises at least a part of a housing for the electric motor.

5. A rig according to claim 1, wherein the bearing means include an outer race connectable to the model and index means secured to the outer race for rotation with the outer race and the model.

6. A rig according to claim 5, including proximity detector means mounted on the support adjacent the outer bearing race for detecting the passage of the index means and generating a signal representing the speed of rotataion of the index means.

7. A rig according to claim 1, including a model base mounted on the bearing means and adapted for detachable connection to a shell of the wind tunnel model.

* * * * *